Figure 1:
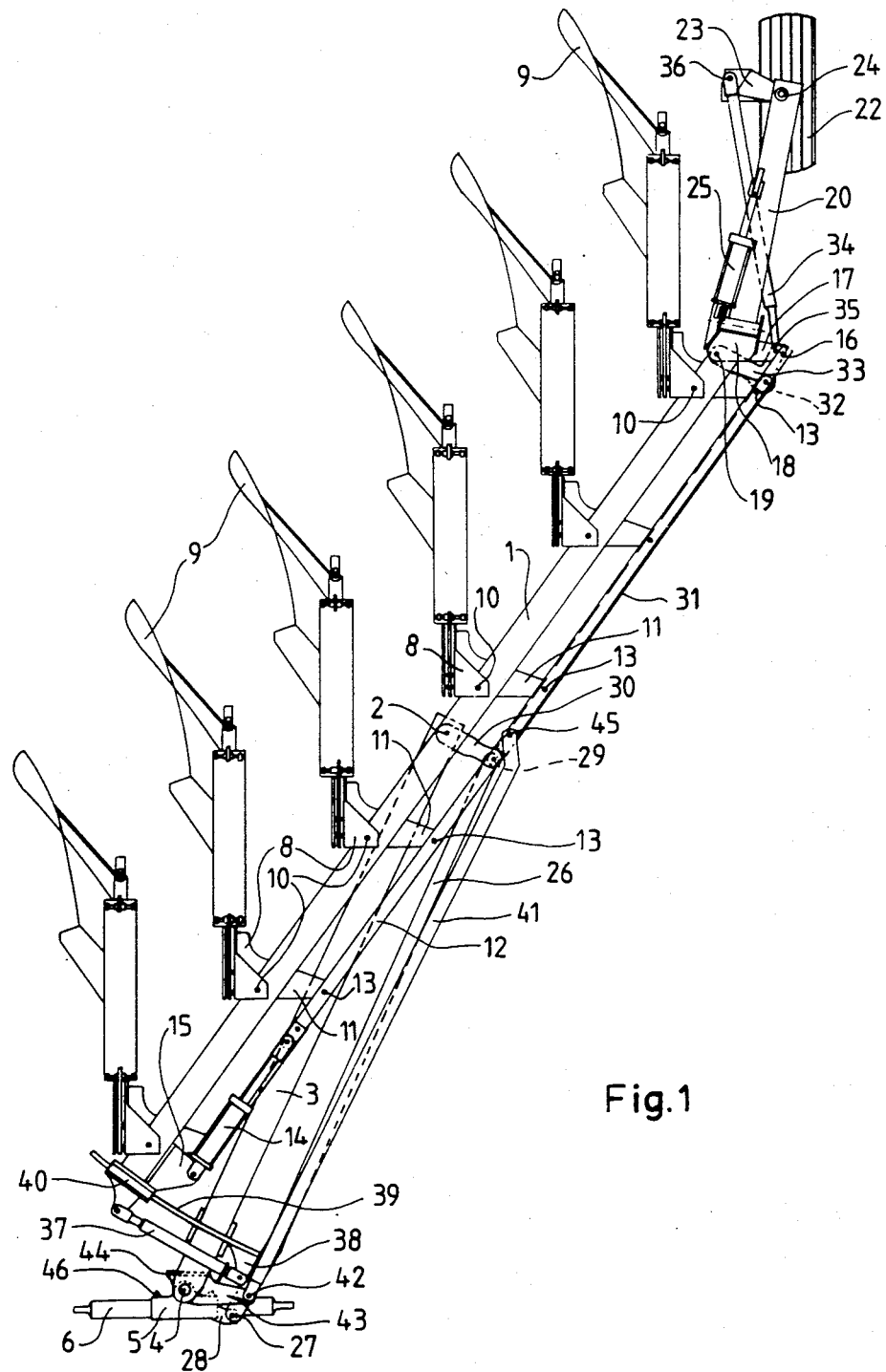

United States Patent [19]

Stangeland

[11] Patent Number: 4,502,544
[45] Date of Patent: Mar. 5, 1985

[54] PLOW ASSEMBLY WITH TURN LIMITER

[75] Inventor: Kjell-Egil Stangeland, Kleppe, Norway

[73] Assignee: Kverneland A/S, Kvernaland, Norway

[21] Appl. No.: 492,130

[22] Filed: May 6, 1983

[30] Foreign Application Priority Data

May 10, 1982 [NO] Norway .................. 821529

[51] Int. Cl.³ .............................................. A01B 69/00
[52] U.S. Cl. ..................................................... 172/283
[58] Field of Search ............... 172/278, 280, 282, 283, 172/284, 285, 287

[56] References Cited

U.S. PATENT DOCUMENTS

| | | | |
|---|---|---|---|
| 3,503,453 | 3/1970 | Johannsen et al. | 172/285 X |
| 3,817,333 | 6/1974 | Kinzenbaw | 172/283 |
| 4,186,806 | 2/1980 | Ward | 172/283 |

Primary Examiner—Richard T. Stouffer
Attorney, Agent, or Firm—Schwartz, Jeffery, Schwaab, Mack, Blumenthal & Koch

[57] ABSTRACT

An assembly on an agricultural implement, especially a semi-plow, wherein the assembly comprises a plurality of pivotable and mutually interacting parallelograms and a plurality of partially interconnected link members (12, 26, 31, 34, 41) which regulate the implement's support wheel (22) and a turn limiter (44), whereby the turn limiter (44) is automatically regulated when the implement is being adjusted to adapt it to the tractor track as well as to the desired plow strip width so that the maximum angle of deflection, to the right or to the left, between the tractor and the turn limiter (44) is held constant no matter what the angle assumed by the implement in relation to the driving direction, said turn limiter thus preventing the tractor from abutting against the implement when the tractor turns sharply, while at the same time the wheel (22) is automatically correctly adjusted when the implement is being adjusted to adapt it to the tractor track and the desired plow strip width, whether the implement is driving in a straight line or on a curved path.

5 Claims, 5 Drawing Figures

PLOW ASSEMBLY WITH TURN LIMITER

The present invention relates to an agricultural implement, in particular a semi-plow. Such plows normally consist of a plurality of plowshares pivotally mounted on a frame that is pivotally attached to the rearward end of a drag beam whose forward end is adapted for pivotal coupling to a tractor, the plow frame usually being supported at the rear and sometimes at other locations by wheels which normally also function to adjust the furrow depth. Such plows can be adjusted for plowing strips of varying widths, i.e., variable furrow spacing.

A drawback of prior art plows of this type is that the support wheel on the plow is not automatically correctly set in the plowing direction during an operation to adjust and adapt the plow to the track gauge of the tractor being utilized to draw the implement.

Another drawback of the known plows of this type is that they are not provided with turn limiters which are automatically regulated during an operation to adapt the plow to the tractor track and to adjust the plow for the desired plow strip width, so as to ensure that the maximum angle of deflection, to the right or to the left, between the tractor and the turn stops remains constant.

The object of the invention is to provide an assembly on an agricultural implement, especially a semi-plow, in which the cultivator means such as plowshares are mounted on a frame supported by one or more wheels, optionally also functioning as furrow depth adjustment wheels, wherein said wheel is automatically correctly adjusted during an operation to adapt the plow to the track of the tractor being used and to adjust it for the desired plow strip width, whether the implement is driving in a straight line or along a curved path, and wherein turn stops are automatically adjusted during an operation to adapt the implement to the tractor track and the desired plow strip width, so that the maximum angle of deflection to either side between the tractor and turn stops is held constant no matter what the angle formed by the frame in relation to the direction of driving.

This objective is obtained with the features recited in the appurtenant patent claims.

Figure 2:
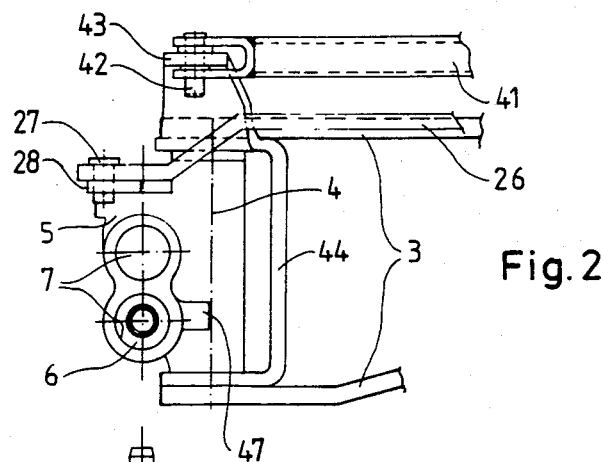
Figure 3:
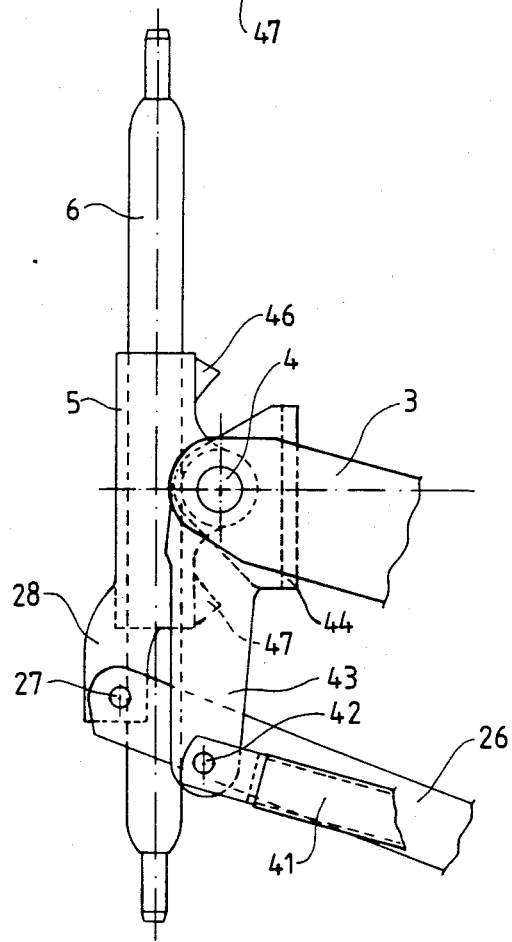
Figure 4:
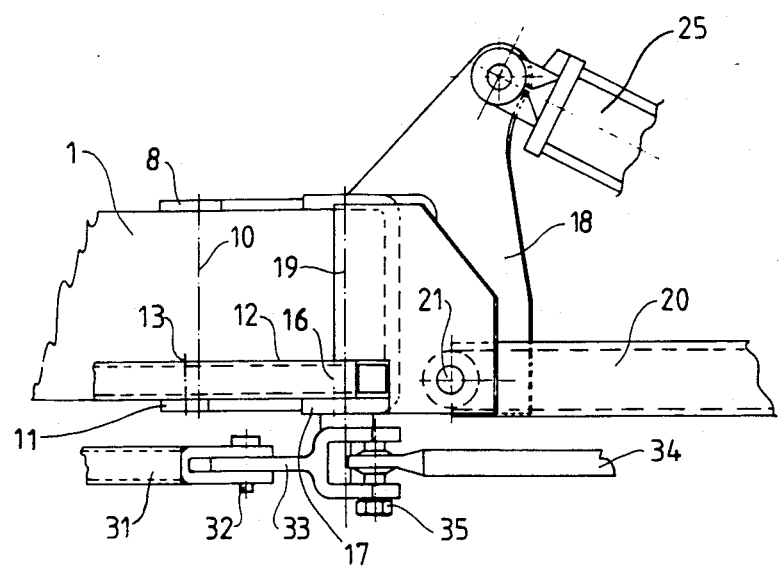
Figure 5:
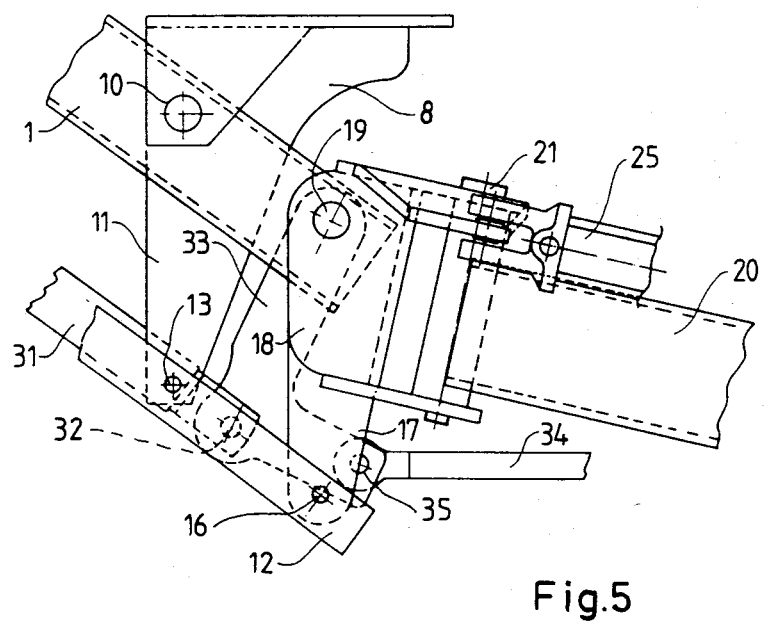

An exemplary embodiment of the invention is illustrated schematically in the accompanying drawings, wherein:

FIG. 1 shows a six-furrow semi-plow with the assembly in accordance with the invention, seen from above, FIG. 2 shows the forward part of the assembly connected to the plow's drag shaft and drag beam, seen from the side and on a larger scale, FIG. 3 shows the forward part of the assembly attached to the plow's drag shaft and drag beam, seen from above, FIG. 4 shows the back part of the assembly attached to the plow frame, seen from the side, and FIG. 5 shows the back part of the assembly attached to the plow frame, seen from above.

The plow frame 1 consists of a rectangular pipe which by means of a bolt 2 is pivotally attached to the rear end of a drag beam 3. The front end of the beam 3 is pivotally fastened by means of a bolt 4 to a swivel member 5 which is pivotally mounted on a drag shaft 6 adapted to be coupled to the drag arms of a tractor. The swivel member 5 is formed with two bores 7 to facilitate adaptation to different types of tractors.

A plurality of plowshare mounts 8 with plowshares 9 fastened thereto with screws are pivotally attached with equidistant spacing to the frame 1 by means of bolts 10. The mounts 8 are formed with an arm 11 which at the free end thereof is pivotally attached to a parallel strut 12 by means of bolts 13. The forward end of the strut 12 is connected to a hydraulic cylinder 14 attached to a bracket 15 on the plow frame 1. At the rearward end, the strut 12 is pivotally connected by means of a bolt 16 to a guide arm 17 on a wheel attachment member 18 which is pivotally mounted with a bolt 19 on the frame 1. One end of a wheel support arm 20 is pivotally mounted by means of a bolt 21 to the attachment member 18 for the wheel. A wheel 22 is rotatably supported by a wheel holder 23 which by means of a bolt 24 is pivotally mounted on the rearward end of the wheel support arm 20. A hydraulic cylinder 25 arranged between the attachment member 18 and the support arm 20 for the wheel is adapted to pivot the arm 20 about the bolt 21, permitting the wheel 22 to be raised and lowered in relation to the plow frame 1. The forward end of a first link 26 is pivotally mounted by means of a bolt 27 to a fixed projection 28 on the swivel member 5. At the rearward end, the first link 26 is pivotally fastened by a bolt 29 to one end of a tie bar 30 whose other end is pivotally mounted by means of said bolt 2 to the plow frame 1 and drag beam 3. A second link 31, which is disposed underneath the parallel strut 12, is pivotally attached at the forward end thereof by means of said bolt 29 to the tie bar 30 and the first link 26. At the rearward end, the second link 31 is pivotally attached by means of a bolt 32 to a coupling member 33 which by means of said bolt 19 is pivotally attached to the plow frame 1 and wheel attachment member 18. The forward end of a third link 34 is pivotally connected by means of a bolt 35 to the coupling member 33. At the rearward end, the third link 34 is pivotally attached to the wheel holder 23 by a bolt 36.

The angle between the plow frame 1 and the drag beam 3 can be varied to adapt to tractors of different track gauges, such that the distance between the closest of the previously plowed furrows and the furrow plowed by the forwardmost plowshare 9 is the same as the distance between the other furrows, even if the plow later is set for a wider or narrower plow strip. The relative angle of these two members is adjusted with the aid of a turnbuckle 37 which is mounted between the front edge of the plow frame 1 and a bracket 38 fastened to a sliding brace 39 which in turn is fastened to the drag beam 3. The free end of the brace 39 is adapted to slide in a fixed guide 40 at the front end of the plow frame 1 when the above adjustment of angular position is being undertaken. The brace 39 is adapted to take up torsional forces on the plow.

The forward end of a link 41 is pivotally mounted by means of a bolt 42 to an adjustment arm 43 which is fixedly connected to a turn limiter body 44 pivotally mounted on said bolt 4, to which the drag beam 3 and swivel member 5 are attached. At the rear end thereof, the link 41 is pivotally attached to the parallel strut 12 by means of a bolt 45.

The turn limiter 44 is adapted to cooperate with a right-hand stop member 46 and a left-hand stop member 47 which are formed as projections on the swivel member 5, positioned one on each side of said bolt 4, so that when the tractor makes a sharp turn to the right, the right-hand stop 46 will abut against the right-hand side of the turn limiter 44 and prevent the right rear wheel of the tractor from contacting the plow, and when the tractor turns sharply to the left, the left-hand stop 47 will abut against the left-hand side of the turn limiter 44 and prevent the left rear wheel of the tractor from contacting the plow.

The plow in accordance with the above-described invention is formed with a number of parallelograms. Thus, the plowshare mounts 8 with their arms 11, the plow frame 1 and the parallel strut 12 form a series of parallelograms with points of rotation about the associated bolts 10 and 13, which means that the distance between the plowshares 9 perpendicular to the plowing direction can be variably adjusted by moving the parallel strut 12 with the aid of the hydraulic cylinder 14 without altering the spacing of the plowshares 9 from each other.

Since the rearmost bolts 10 and 13, which connect the rearmost plowshare mount 8 including its arm 11 to the plow frame 1 and the parallel strut 12, together with the bolt 16 and the bolt 19, which connect the guide arm 17 to the parallel strut 12 and the plow frame 1, constitute four points of rotation at the corners of a parallelogram, and since the guide arm 17 is fixedly connected to the attachment member 18 to which the wheel support arm 20 is fastened, a longitudinal vertical plane through the wheel arm 20 will always form a constant angle in relation to the plowing direction. Said bolt 4 at the forward end of the drag beam 3 and the bolt 27 which connects the first link 26 to the fixed projection 28 on the swivel member 5, together with the bolt 29 and the bolt 2 which connects the tie bar 30 to the first link 26 and the drag beam 3 and the plow frame 1, constitute four points of rotation at the corners of a parallelogram. The latter parallelogram has pivot points 2 and 29 jointly with yet another parallelogram which also includes the bolt 32 and the bolt 19 which connects the coupling member 33 to the second link 31 and the plow frame 1 and the attachment member 18 for the depth adjustment wheel. When the angle between the plow frame 1 and the drag beam 3 is adjusted by means of the turnbuckle 37, the tie bar 30 and thereby the coupling member 33 will remain stationary, in that a vertical plane through the bolt 4 and the bolt 27 will always form a constant angle in relation to the plowing direction, because the bolts 4, 27, 29, 2, 19 and 32 constitute points of rotation at the corners of two interconnected and therefore mutually interacting parallelograms, whereof the forwardmost operates against the drag beam 3 and the rearmost against the plow frame 1. Since the coupling member 33, as explained above, remains stationary during the adjustment of the angle between the plow frame 1 and the drag beam 3, the third link 34, which at the forward end is pivotally fastened to the coupling member 33, and the wheel holder 23, which is pivotally attached to the rear end of the third link 34 and to the wheel arm 20, will also remain stationary. Consequently, the wheel 22, which is mounted on the wheel holder 23, will also remain stationary in the plowing direction during adjustment of the angle between the plow frame 1 and the drag beam 3.

The bolt 4, the bolt 42, the bolt 45 and the bolt 2 constitute four points of rotation at the corners of a parallelogram. The latter parallelogram has bolts 2 and 45 jointly with a further plurality of parallelograms wherein a bolt 13 and a bolt 10 also form points of rotation at the corners of the parallelogram. When the plow is set for a larger or smaller plow strip width by moving the parallel strut 12 longitudinally in relation to the plow frame 1 by means of the hydraulic cylinder 14, the plowshares 9, owing to their pressure against the ground, will automatically be adjusted in the plowing direction, the plow pivoting about the bolt 4 at the forward end of the drag beam 3. Owing to the fact that the bolts 4, 42, 45, 2, 10 and 13 constitute points of rotation at the corners of several interconnected and therefore interacting parallelograms, the adjustment arm 43 and the turn limiter 44 connected thereto will always assume the same position in relation to the stop members 46 and 47 on the swivel member 5 and in relation to the plowing direction.

When the tractor, in the transport position, turns to the right or left, the first link 26, second link 31 and third link 34 will be correspondingly moved longitudinally to pivot the wheel holder 23 mounted at 24 on the arm 20, so that when the tractor turns to the right the wheel 22 will turn to the left, and when the tractor turns to the left the wheel 22 will pivot to the right.

I claim:

1. A plow assembly comprising:

a frame;

a drag beam having one end pivotally attached to said frame;

means for pivotally attaching the other end of said drag beam to a traction vehicle;

a plurality of plowshares pivotally mounted on said frame by means of plow mounts;

a wheel assembly pivotally supported at the rear of said frame and carrying a steerable wheel;

a strut extending longitudinally parallel to said frame and pivotally connected to said plow mounts and said wheel assembly to form a plurality of interacting parallelograms, said strut being longitudinally displaceable to pivot said plows and said wheel assembly in order to adjust the width of said plow assembly;

steering means interposed between a turning member and said steerable wheel; said turning member being turnable with a traction vehicle when said vehicle pulls said plow assembly and said turning member being adapted to turn said steerable wheel in response to turning of the traction vehicle;

means for pivoting said frame with respect to said drag beam to vary the angle of said drag beam in order to adjust the plow assembly to the track of a traction vehicle when said vehicle pulls the plow assembly;

a turn limiter pivotally attached to said drag beam attaching means and independently pivotable about the same axis as said drag beam, said turn limiter cooperating with stop means on said drag beam attaching means to prevent a traction vehicle when pulling said plow assembly from turning more than a desired angle with respect said plow assembly, thereby preventing the traction vehicle from abutting against said plow assembly when turning sharply, and a link member having one end pivotally connected to a laterally projecting adjustment arm on said turn limiter and having its other end pivotally connected to said parallel strut such that a parallelogram is defined by the pivot axis between said drag beam and turn limiter and said drag beam attaching means, the pivot axis between said drag beam and said frame, the pivot axis between said parallel strut and said link member, and the pivot axis between said link member and said adjustment arm on said turn limiter, so that said turn limiter is automatically adjusted when said plow assembly is adjusted to adapt it to the track of a traction vehicle and when the plow strip width of the plow assembly is adjusted, and so that the maximum angle of deflection between the tractor and the turn limiter is held constant regardless of the angles assumed by the drag beam and the frame in relation to the plowing direction.

2. A plow assembly according to claim 1 wherein said plow assembly is a semi-plow.

3. A plow assembly according to claim 1 wherein said wheel assembly is vertically adjustable to vary the furrow depth cut by the plowshares.

4. A plow assembly according to claim 1 wherein said means for pivoting said frame with respect to said drag beam comprise a turnbuckle connected between said drag beam and said frame.

5. A plow assembly according to claim 1 wherein said steering means comprises a parallelogram linkage defining a plurality of interacting parallelograms which properly orient and steer said wheel for all plow strip width settings of said plow assembly.

* * * * *